March 26, 1963 N. J. OLENIK 3,082,913
TRANSFER DEVICE
Filed April 6, 1960
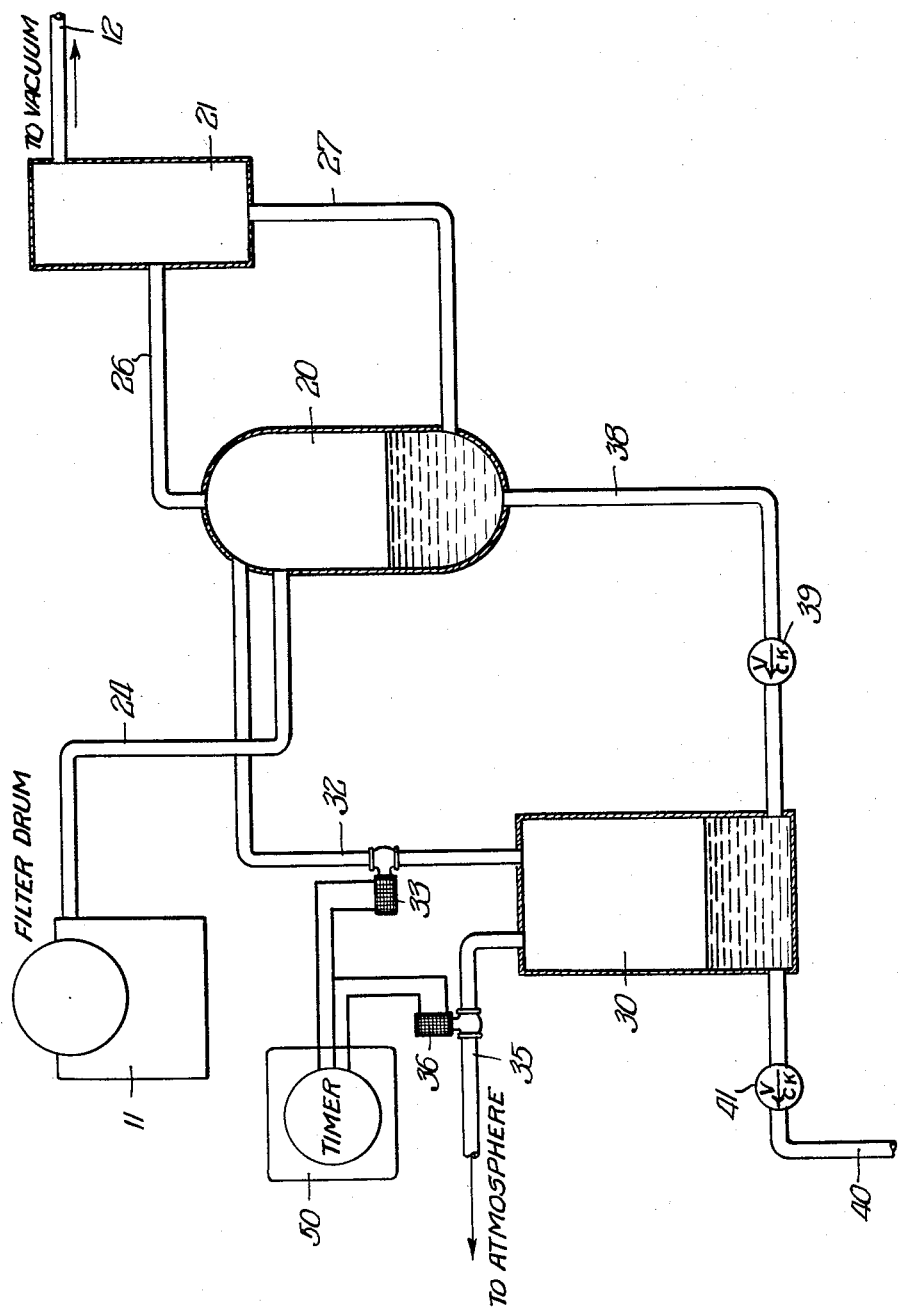

United States Patent Office 3,082,913
Patented Mar. 26, 1963

3,082,913
TRANSFER DEVICE
Nicholas J. Olenik, Hammond, Ind., assignor to Inland Steel Company, Chicago, Ill., a corporation of Delaware
Filed Apr. 6, 1960, Ser. No. 20,327
1 Claim. (Cl. 222—70)

This invention relates, as indicated, to a transfer device, and more particularly to an apparatus for moving materials from the system having pressures within a certain range to a location of relatively higher pressures.

In a tank containing a liquid under a reduced pressure, the liquid will not ordinarily be discharged to atmosphere from the tank through a conduit by gravity flow at a satisfactory rate. For this reason, in most cases it is necessary to apply a pump in order to eliminate the contents.

The present invention has as its principal object an apparatus for transferring materials from a container under one set of pressures to a location having relatively higher pressures. It is a further object of the invention to provide a discharge apparatus for eliminating liquids from settling tanks maintained under reduced pressures less than atmospheric.

Further objects and advantages of this invention will become evident as the description proceeds and from an examination of the accompanying drawing which illustrates one embodiment of the invention. In the drawing, the single FIGURE diagrammatically illustrates a flue dust recovery system embodying the present invention.

Referring to the drawing, the transfer device of the invention is illustrated in association with a filter drum 11 for recovery of flue dust. The filter drum is connected to a vacuum source 12. To the surface of the drum is applied the slurry containing flue dust to be recovered. The solid material is collected on the surface of the drum, from which it is removed by a knife (not shown). The air as it is drawn through the drum to vacuum source 12 picks up entrained moisture. For this reason, a water settling tank 20 and a moisture tank 21 are interposed between the source of vacuum 12 and the filter drum 11 in order to separate the water from the air. A pipe 24 from the filter drum 11 is connected to the water settling tank 20 and a pipe 26 communicates between the upper portion of the water settling tank 20 and the moisture tank 21. Moisture tank 21 is connected at its upper portion to a source of vacuum 12, which in turn is connected to a vacuum pump (not shown). As the air passes from the filter drum through tanks 20 and 21, the moisture is separated from the air and collected in the bottom portions of the tanks. The moisture tank 21 has a pipe 27 that conducts the water collected therein to the water settling tank 20, the latter of which is mounted at a lower level.

After a period of use, tanks 20 and 21 are filled with water. Eventually, the collected water will be drawn into the source of vacuum 12 if it is not removed. Previously, water has been eliminated from the tanks 20, 21 by a water pump.

Although the transfer device of the present invention is shown associated with the above described system for flue dust recovery, it will be apparent that the invention may be employed in other systems. The transfer device of the invention will now be described.

A transfer chamber 30 has a conduit 32 connected to the upper portion thereof so as to be above the water level, and communicating with the source of vacuum 12, for example, by connection to the upper portion of the water settling tank 20 above the water level. A solenoid operated valve 33 is mounted in conduit 32. Valve 33 is normally closed.

A second conduit 35, also connected to the upper portion of the transfer chamber 30, so as to be above the water level therein, communicates with the atmosphere. A solenoid operated valve 36, normally closed, is mounted in conduit 35.

A transfer conduit is connected to the bottom of water settling tank 20 for conducting the water contained therein to transfer chamber 30. A check valve 39 in pipe 38 permits movements of the water only from the tank to the transfer chamber. It will be noted that the transfer chamber is positioned at a lower level than the tank 30 in order to permit gravity flow of the water from the tank 20 to the chamber 30.

A removal conduit 40 communicates with the lower portion of transfer chamber 30 for discharge of the water from the transfer chamber into another vessel (not shown), or to a sewer, by gravity flow. A check valve 41 in conduit 40 allows movement of the water in conduit 40 only away from the transfer chamber 30.

An electrically operated timer 50 controls the operation of the solenoids 33, 36. The timer opens solenoid valve 33 for a period of time, for example, approximately 40 seconds, after which it is closed. Then the solenoid valve 36 is open for a period of time, for example, approximately 12 seconds, after which it is closed. The cycle is then repeated. The foregoing time periods are given only by way of illustration, and obviously may be varied for different situations.

From the foregoing, it is believed that operation of the transfer device of the invention is apparent. In the flue dust recovery system given by way of illustration, water is collected in tank 20 which is under reduced pressures less than atmospheric. The timer 50 first opens solenoid valve 33, while solenoid valve 36 remains closed, to place the transfer chamber 30 under the same reduced pressures as settling tank 20. While the transfer chamber is under the reduced pressure, water flows to the settling tank from transfer chamber through pipe 38 by gravity. The check valve 41 in conduit 40 is closed during this time so that the reduced pressure is maintained in chamber 30, and there is no reverse flow of fluids through conduit 40.

Subsequently, the timer closes valve 33 and opens valve 36, in order to place the transfer chamber at atmospheric pressures. The water in the transfer chamber 30 now flows by gravity through conduit 40. Check valve 39 is closed, preventing the water from being forced and returned into the settling tank 20.

In the drawing and specification there has been set forth a preferred embodiment of the invention, and although specific terms are employed, these are used in a generic and descriptive sense only, and not for purposes of limitation. Changes in form and proportion of parts, as well as the substitution of equivalents, are contemplated, as circumstances may suggest or render expedient, without departing from the spirit or scope of this invention, as further defined in the following claim.

I claim:

A transfer device for moving materials from a system under reduced pressures to a location of relatively higher pressure, comprising, a container for containing materials to be moved, pressure means for maintaining said container at a first pressure level, a transfer chamber, a first pressure conduit communicating with said transfer chamber and said pressure means for placing said transfer chamber at the same pressures as said container, a first solenoid valve in said first pressure conduit, a second pressure conduit for communicating higher pressures to said transfer chamber than maintained in said container, a second solenoid valve in said second pressure conduit, a materials transfer conduit between said container and said transfer chamber for conducting the materials from said container to said transfer chamber by gravity when said transfer chamber is at the same pressures as said container, a check valve in said materials transfer conduit for unidirectional flow from said container to said chamber, a removal conduit connected to said transfer chamber removing the materials therefrom when said discharge chamber is at higher pressure during the period in which said second solenoid valve is open, a check valve in said removal conduit for unidirectional flow from said discharge chamber, and timer means for alternately opening said first and second solenoid valves in order to place said transfer chamber alternately under the pressure of said container and the higher pressure of said second pressure conduit.

References Cited in the file of this patent

UNITED STATES PATENTS

| | | |
|---|---|---|
| 1,799,590 | Kiefer | Apr. 7, 1931 |
| 2,449,634 | Baade | Sept. 21, 1948 |
| 2,921,715 | Asset et al. | Jan. 19, 1960 |
| 3,002,523 | Rabbitts | Oct. 3, 1961 |